United States Patent
Oyama et al.

(10) Patent No.: US 9,634,764 B2
(45) Date of Patent: Apr. 25, 2017

(54) ESTIMATING DEVICE AND METHOD FOR ESTIMATING

(71) Applicant: FUJITSU LIMITED, Kawasaki-shi, Kanagawa (JP)

(72) Inventors: Tomofumi Oyama, Kawasaki (JP); Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/989,074

(22) Filed: Jan. 6, 2016

(65) Prior Publication Data

US 2016/0226582 A1 Aug. 4, 2016

(30) Foreign Application Priority Data

Jan. 30, 2015 (JP) .................................. 2015-016896

(51) Int. Cl.
*H04B 10/00* (2013.01)
*H04B 10/079* (2013.01)
(Continued)

(52) U.S. Cl.
CPC ... *H04B 10/07955* (2013.01); *H04B 10/0775* (2013.01); *H04B 10/07953* (2013.01); *H04B 10/6163* (2013.01)

(58) Field of Classification Search
CPC .......... H04B 10/07955; H04B 10/0775; H04B 10/6163; H04B 10/07953
See application file for complete search history.

(56) References Cited

U.S. PATENT DOCUMENTS

| 5,396,166 A * | 3/1995 | Vohra .................. G01R 15/241 |
| | | 250/227.14 |
| 7,149,407 B1 * | 12/2006 | Doerr ............... H04B 10/07953 |
| | | 385/11 |

(Continued)

FOREIGN PATENT DOCUMENTS

| JP | 2009-021943 | 1/2009 |
| JP | 2013-229718 | 11/2013 |

OTHER PUBLICATIONS

Mayrock et al., "Monitoring of Linear and Nonlinear Signal Distortion in Coherent Optical OFDM Transmission," Journal of Lightwave Technology, IEEE, Aug. 2009, vol. 27, No. 16, pp. 3560-3566.
(Continued)

*Primary Examiner* — Danny Leung
(74) *Attorney, Agent, or Firm* — Fujitsu Patent Center

(57) ABSTRACT

An estimating device includes a detector and an estimator. The detector detects a first parameter representing a ratio of a power of a signal component in received light to a power of a noise component in the received signal, a second parameter representing a sum of the power of the signal component and the power of the noise component, and a third parameter representing a sum of a power of a component being derived from cross phase modulation and being contained in the noise component and a power of a component being derived from spontaneously emitted light and being contained in the noise component. The estimator estimates, based on the first through the third parameters, a fourth parameter representing a ratio of the power of the signal component to a power of a component being derived from self phase modulation and being contained in the noise component.

20 Claims, 11 Drawing Sheets

(51) Int. Cl.
H04B 10/077 (2013.01)
H04B 10/61 (2013.01)

(56) References Cited

U.S. PATENT DOCUMENTS

| | | | | |
|---|---|---|---|---|
| 7,203,428 | B2* | 4/2007 | Waarts | H04B 10/2569 398/202 |
| 7,680,412 | B2* | 3/2010 | Anderson | H04B 10/07955 398/177 |
| 2001/0052981 | A1* | 12/2001 | Chung | G01J 4/00 356/364 |
| 2002/0001115 | A1* | 1/2002 | Ishida | G02F 1/0123 398/182 |
| 2002/0149814 | A1* | 10/2002 | Sorin | H04B 10/0795 398/9 |
| 2003/0090755 | A1* | 5/2003 | Chung | H04B 10/07953 398/26 |
| 2004/0114923 | A1* | 6/2004 | Chung | H04B 10/07955 398/26 |
| 2009/0016712 | A1* | 1/2009 | Kagawa | H04B 10/07953 398/9 |
| 2010/0129074 | A1* | 5/2010 | Gariepy | H04B 10/0795 398/26 |
| 2011/0033182 | A1* | 2/2011 | Haunstein | H04B 10/60 398/26 |
| 2016/0226582 | A1* | 8/2016 | Oyama | H04B 10/0775 |

OTHER PUBLICATIONS

Okamoto et al.,"Digital In-Band OSNR Estimation for Polarization-Multiplexed Optical Transmission," 2013 18th OptoElectronics and Communications Conference held jointly with 2013 International Conference on Photonics in Switching (OECC/PS), IEICE, Jun. 2013, TuR2-4.

Oda et al.,"Accurate Bit Error Ratio Monitor by Spectral Filtering and Optical Power Measurements," Optical Fiber Communications Conference and Exhibition (OFC) 2014, IEEE, Mar. 2014, W1G.6.

Faruk et aL,"Estimation of OSNR for Nyquist-WDM Transmission Systems Using Statistical Moments of Equalized Signals in Digital Coherent Receivers," Optical Fiber Communications Conference and Exhibition (OFC) 2014, IEEE, Mar. 2014, Th2A29.

Nebendahl et al.,"Quality Metrics in Optical Modulation Analysis: EVM and its relation to Q-factor, OSNR, and BER," Asia Communications and Photonics Conference (ACP) 2012, IEEE, Nov. 2012, AF3G.2.

Ip et al.,"Compensation of Dispersion and Nonlinear Impairments Using Digital Backpropagation," Journal of Lightwave Technology, IEEE, Oct. 2008, vol. 26, No. 20, pp. 3416-3425.

Tao et al.,"Multiplier-Free Intrachannel Nonlinearity Compensating Algorithm Operating at Symbol Rate," Journal of Lightwave Technology, IEEE, Sep. 2011, vol. 29, No. 17, pp. 2570-2576.

Yan et al.,"Low Complexity Digital Perturbation Back-Propagation," 2011 37th European Conference and Exhibition on Optical Communication (ECOC), IEEE, Sep. 2011, Tu.3.A.2.

EESR—The Extended European Search Report mailed on Jun. 28, 2016 for corresponding European Application No. 15199535.4.

Zhu et al. "Nonlinear phase noise in coherent optical OFDM transmission systems," Optics Express, vol. 18, No. 7, pp. 7347-7360, Mar. 29, 2010.

Velasco et al. "Statistical Approach for Fast Impairment-Aware Provisioning in Dynamic All-Optical Networks," Journal of Optical Communications and Networking, vol. 4, No. 2, pp. 130-141, Feb. 2012.

* cited by examiner

ESTIMATING DEVICE AND METHOD FOR ESTIMATING

CROSS-REFERENCE TO RELATED APPLICATION

This application is based upon and claims the benefit of priority of the prior Japanese Patent application No. 2015-016896, filed on Jan. 30, 2015, the entire contents of which are incorporated herein by reference.

FIELD

The embodiments discussed herein are related to an estimating device and a method for estimating.

BACKGROUND

One of the known optical communication systems transmits light signals through an optical fiber (see Patent Literatures 1 and 2 and Non-Patent Literatures 1-8). In an optical communication system, the received light contains a signal component and a noise component. A noise component contains components derived from self phase modulation, cross phase modulation, and spontaneously emitted light.

An example of an optical communication system changes the power of a signal to be transmitted and detects the power of a noise component contained in received light for each of different powers. The optical communication system estimates a ratio of the power of a signal component of the received light to the power of the component being derived from self phase modulation and being contained in the noise component of received light.

[Patent Literature 1] Japanese Laid-Open Patent Publication No. 2009-21943

[Patent Literature 2] Japanese Laid-Open Patent Publication No. 2013-229718

Non-Patent Literature

[Non-Patent Literature 1] M. Mayrock, H. Haunstein, "Monitoring of Linear and Nonlinear Signal Distortion in Coherent Optical OFDM Transmission", Journal of Lightwave Technology, IEEE, August 2009, vol. 27, No. 16, pp. 3560-3566

[Non-Patent Literature 2] S. Okamoto, and four other persons, "Digital In-Band OSNR Estimation for Polarization-Multiplexed Optical Transmission", 2013 18th Opto-Electronics and Communications Conference held jointly with 2013 International Conference on Photonics in Switching (OECC/PS), IEICE, June 2013, TuR2-4

[Non-Patent Literature 3] S. Oda, and seven other persons, "Accurate Bit Error Ratio Monitor by Spectral Filtering and Optical Power Measurements", Optical Fiber Communications Conference and Exhibition (OFC) 2014, IEEE, March 2014, W1G. 6

[Non-Patent Literature 4] M. S. Faruk, and two other persons, "Estimation of OSNR for Nyquist-WDM Transmission Systems Using Statistical Moments of Equalized Signals in Digital Coherent Receivers", Optical Fiber Communications Conference and Exhibition (OFC) 2014, IEEE, March 2014, Th2A.29

[Non-Patent Literature 5] B. Nebendahl, and twelve other persons, "Quality Metrics in Optical Modulation Analysis: EVM and its relation to Q-factor, OSNR, and BER", Asia Communications and Photonics Conference (ACP) 2012, IEEE, November 2012, AF3G.2

[Non-Patent Literature 6] E. Ip and J. M. Kahn, "Compensation of Dispersion and Nonlinear Impairments Using Digital Backpropagation", Journal of Lightwave Technology, IEEE, October 2008, vol. 26, No. 20, pp. 3416-3425

[Non-Patent Literature 7] Z. Tao, and five other persons, "Multiplier-Free Intrachannel Nonlinearity Compensating Algorithm Operating at Symbol Rate", Journal of Lightwave Technology, IEEE, September 2011, vol. 29, No. 17, pp. 2570-2576

[Non-Patent Literature 8] W. Yan, and seven other person, "Low Complexity Digital Perturbation Back-Propagation", 2011 37th European Conference and Exhibition on Optical Communication (ECOC), IEEE, September 2011, Tu.3.A.2

SUMMARY

The component being derived from self phase modulation and being contained in the noise component of received light nonlinearly fluctuates with respect to the power of a signal to be transmitted. This sometimes makes the optical communication system impossible to precisely estimate the above ratio of signal to be transmitted while the optical communication system is working.

As one aspect of the embodiments, there is provided an estimating device including a detector and an estimator.

The detector detects a first parameter representing a ratio of a power of a signal component in received light to a power of a noise component in the received signal, a second parameter representing a sum of the power of the signal component and the power of the noise component, and a third parameter representing a sum of a power of a component being derived from cross phase modulation and being contained in the noise component and a power of a component being derived from spontaneously emitted light and being contained in the noise component.

The estimator estimates, based on the first through the third parameters, a fourth parameter representing a ratio of the power of the signal component to a power of a component being derived from self phase modulation and being contained in the noise component.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, embodiments of the present disclosure will now be described by referring to the accompanying drawings. However, the following embodiments are merely exemplary, and modification and application of technique that are not clarified in the description below is not excluded. Like reference numbers in all the drawings referred in the following embodiments designate the same or the substantially same parts and elements unless changes and modifications are specified.

First Embodiment (Configuration)

Figure 1:
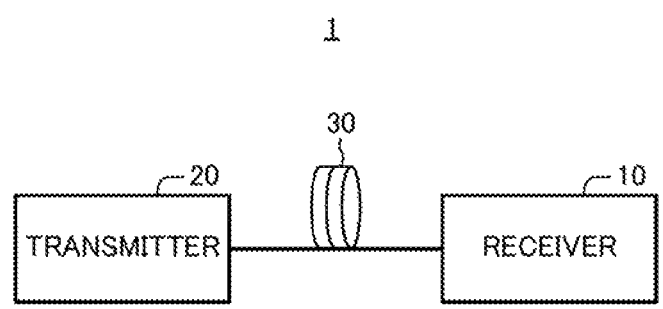
FIG. 1 is a block diagram schematically illustrating an example of the configuration of an optical communication system according to a first embodiment.

As illustrated in FIG. 1, an optical communication system 1 of the first embodiment includes, for example, a receiver 10 and a transmitter 20. The receiver 10 is an example of an estimating device. The receiver 10 is connected to the transmitter 20 via an optical path 30, which is formed of an optical fiber in this embodiment.

The transmitter 20 transmits an optical signal to the receiver 10 via the optical path 30 in, for example, the scheme of Wavelength Division Multiplexing (WDM).

Figure 2:
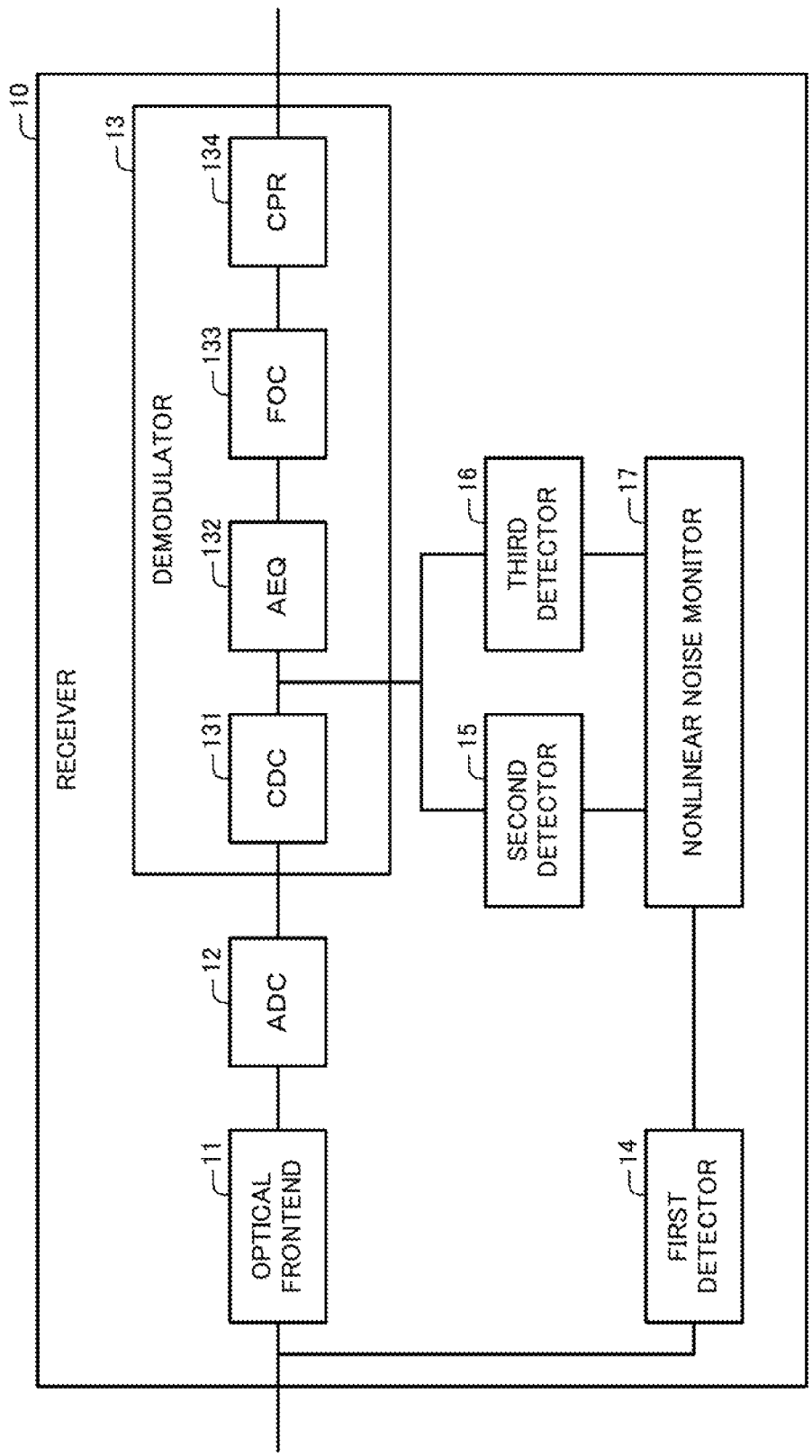
FIG. 2 is a block diagram illustrating an example of the configuration of a receiver of FIG. 1.

As illustrated in FIG. 2, the receiver 10 of the first embodiment includes an optical frontend 11, an Analog-to-Digital Converter (ADC) 12, a demodulator 13, a first detector 14, a second detector 15, a third detector 16, and a nonlinear noise monitor 17.

The optical frontend 11 includes a light source that generates local oscillation light and conducts an optical-to-electrical (OE) conversion of the light (i.e., received light) that the receiver 10 has received via the optical path 30 using the local oscillation light. The OE conversion converts an optical signal into an electric signal.

The ADC 12 converts the analog electric signal having undergone the conversion by the optical frontend 11 into a digital electric signal.

The demodulator 13 demodulates the digital signal having undergone the conversion by the ADC 12. The demodulator 13 of the first embodiment includes a Chromatic Dispersion Compensator (CDC) 131, an Adaptive Equalizer (AEQ) 132, a Frequency Offset Compensator (FOC) 133, and a Carrier Phase Recovery (CPR) 134.

The CDC 131 compensates for chromatic dispersion. The AEQ 132 compensates for the chromatic dispersion (i.e., residual chromatic dispersion) that has not been compensated by the CDC 131 and also compensates for polarization mode dispersion. The FOC 133 compensates for the frequency difference (i.e., frequency deviation) between the transmitter 20 and the receiver 10. The CPR 134 compensates for the phase difference (i.e., phase deviation) between the transmitter 20 and the receiver 10.

In this embodiment, the demodulator 13 demodulates a signal having undergone the compensation by the CPR 134. The demodulator 13 may further carry out error correction on the demodulated signal.

The first detector 14 detects a first parameter representing a ratio of the power of a signal component in received light to the power of a noise component in the received light. As denoted in Expression 1, the first parameter $R_{OSNR}$ of this embodiment is a value obtained by dividing the power $P_s$ of a signal component of the received light by the power $P_n$ of a noise component of the received light.

$$R_{OSNR} = \frac{P_s}{P_n} \qquad \text{[Expression 1]}$$

Figure 3:
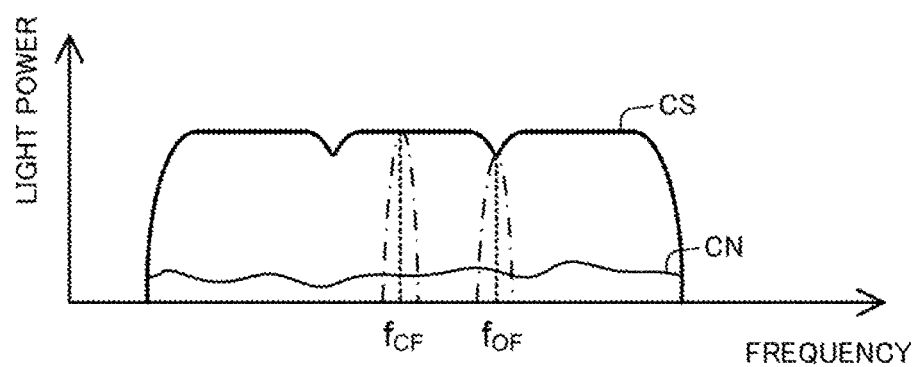
FIG. 3 is a graph depicting an example of a power of a signal component and a power of a noise component both contained in received light.

For example, as illustrated in FIG. 3, the first detector 14 detects a power $P_{CF}$ of a component having a frequency $f_{CF}$ among the received light and a power $P_{OF}$ of a component having a frequency $f_{OF}$ among the received light. Here, the frequency $f_{CF}$ may be referred to as a third frequency to be discriminated from first and second frequencies to be described below and the frequency $f_{OF}$ may be referred to as a fourth frequency to be discriminated from the first and second frequencies to be described below.

The curve CS in FIG. 3 represents the power of a signal component in received light, and the curve CN represents the power of a noise component in the received light. A power may be referred to as a light power.

In this embodiment, the first detector 14 includes a first Optical Bandpass Filter (OBPF) having a pass band covering the third frequency $f_{CF}$ and a second OBPF having a pass band covering the fourth frequency $f_{OF}$. The first detector 14 detects the power of a component having passed through the first OBPF as a first power $P_{CF}$ and also detects the power of a component having passed through the second OBPF as a second power $P_{OF}$.

The first detector 14 calculates a first parameter $R_{OSNR}$ on the basis of Expression 2. The symbol γ is represented by Expression 3. In this embodiment, the transmitter 20 transmits a third signal having the third frequency $f_{CF}$ as a carrier wave frequency at a third power and also transmits a fourth signal having the fourth frequency $f_{OF}$ as the carrier wave frequency at a fourth power different from the third power. The symbol d represents a value obtained by dividing the fourth power by the third power.

$$R_{OSNR} = \frac{\beta(1-\gamma)}{\gamma \cdot d - 1} \qquad \text{[Expression 2]}$$

$$\gamma = \frac{P_{CF}}{P_{OF}} \qquad \text{[Expression 3]}$$

where, β represents a calibration parameter determined on the basis of a relationship among the bandwidths and the gains of the first and the second OBPFs, a signal component in received light, and the bandwidth of a noise component in the received light. In this embodiment, the first detector 14 retains the calibration parameter β beforehand.

The second detector 15 detects a second parameter $P_t$ representing the sum of the power $P_s$ of a signal component of the received light and the power $P_n$ of a noise component of the received light. In this embodiment, as denoted by Expression 4, the second parameter $P_t$ is the sum of the power $P_s$ of the signal component of the received light and the power $P_n$ of the noise component of the received light.

$$P_t = P_s + P_n \qquad \text{[Expression 4]}$$

In this embodiment, the transmitter 20 transmits a known signal for a first period. A known signal is commonly known to both the transmitter 20 and the receiver 10. A known signal is predetermined and has a predetermined frequency. A known signal may be retained by the transmitter 20 and the receiver 10 in advance or may be generated by the transmitter 20 and the receiver 10. A known signal may also be referred to as a pilot signal and the first period may also be referred to as a pilot period.

The transmitter 20 further transmits a data signal for a second period different from the first period. A data signal is not predetermined beforehand. This means that a data signal is unknown to the receiver 10. The second period may also be referred to as a data period.

Figure 4:
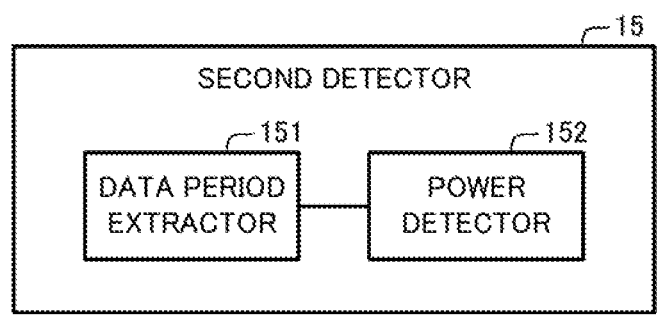
FIG. 4 is a block diagram schematically illustrating an example of the configuration of a second detector of FIG. 2.

For example, as illustrated in FIG. 4, the second detector 15 includes a data period extractor 151 and a power detector 152.

The data period extractor 151 detects the pilot period on the basis of the pilot signal retained in the receiver 10, and detects a period different from the detected pilot period to be the data period. The data period extractor 151 extracts a signal within the detected data period from the signal having undergone the compensation by the CDC 131. In the first embodiment, the signal within the data period is a fraction transmitted during the data period among the received light.

The power detector 152 detects the power of the signal extracted by the data period extractor 151 as the second parameter $P_t$. The power detected by the power detector 152 takes a value sufficiently close to the sum of the power of the signal component of the received light and the power of the noise component of the received light. Accordingly, the receiver 10 can detect a precise second parameter $P_t$.

The third detector 16 detects a third parameter $P_A$ representing a sum of the power of a component being derived from cross phase modulation and being contained in the noise component of received light and the power of a component being derived from spontaneously emitted light and being contained in the noise component of the received light. In the first embodiment, as denoted in Expression 5, the third parameter $P_A$ is the sum of the power $P_{XPM}$ of a component being derived from cross phase modulation and being contained in the noise component of received light and the power $P_{ASE}$ of a component being derived from spontaneously emitted light and being contained in the noise component of the received light.

$$P_A = P_{ASE} + P_{XPM} \qquad \text{[Expression 5]}$$

Figure 5:
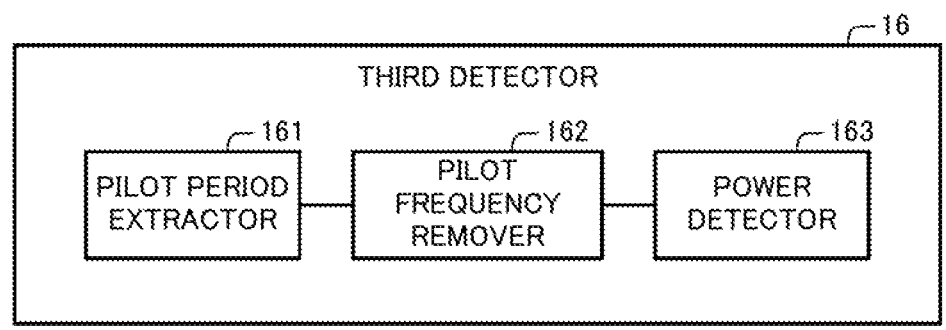
FIG. 5 is a block diagram schematically illustrating an example of the configuration of a third detector of FIG. 2.

For example, as illustrated in FIG. 5, the third detector 16 includes a pilot period extractor 161, a pilot frequency remover 162, and a power detector 163.

The pilot period extractor 161 detects a pilot period on the basis of the pilot signal retained in the receiver 10. The pilot period extractor 161 extracts a signal within the detected pilot period from a signal having undergone the compensation conducted by the CDC 131. In this embodiment, a signal within a pilot period is a fraction transmitted during the pilot period among the received light.

Figure 6:
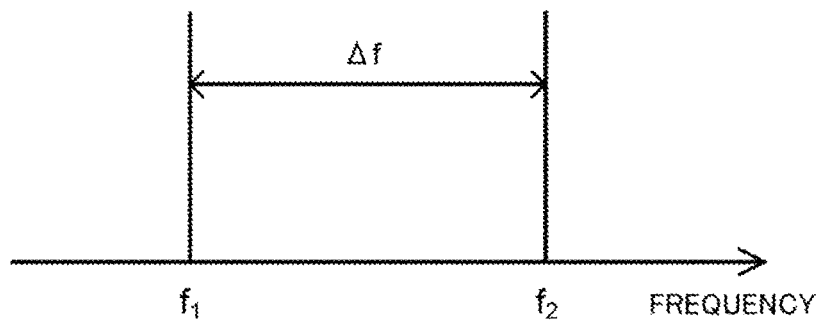
FIG. 6 is a diagram explaining the frequency that a pilot signal has.

The pilot frequency remover 162 removes a component having a frequency the same as that of the pilot signal from a signal extracted by the pilot period extractor 161. In this embodiment, as illustrated in FIG. 6, the pilot signal contains a component having a first frequency $f_1$ and a component having a second frequency $f_2$ higher by value $\Delta f$ than the first frequency $f_1$. Accordingly, the pilot frequency remover 162 removes a component having the first frequency $f_1$ and a component having a second frequency $f_2$ from the signal extracted by the pilot period extractor 161.

In other words, the signal remaining after the removal by the pilot frequency remover 162 is a component having a frequency different from those of the pilot signal and being contained in a fraction transmitted during the pilot period among the received light.

The power detector 163 detects the power of the signal remaining after the removal by the pilot frequency remover 162 as the third parameter $P_A$.

When light enters an optical fiber, polarization induced in the optical fiber contains a component representing a cubic non-linear optical effect, such as the Kerr effect.

Here, assuming a case where light having components having three frequencies $f_a$, $f_b$, and $f_c$ enters an optical fiber, the light entering the optical fiber has an electric field E represented by Expression 6.

$$E = \tfrac{1}{2} E_a e^{-2\pi j f_a t} + \tfrac{1}{2} E_b e^{-2\pi j f_b t} + \tfrac{1}{2} E_c e^{-2\pi j f_c t} \qquad \text{[Expression 6]}$$

where, $E_a$ represents the twice the amplitude of the electric field of the component having the frequency $f_a$ among the light; $E_b$ represents the twice the amplitude of the electric field of the component having the frequency $f_b$ among the light; $E_c$ represents the twice the amplitude of the electric field of the component having the frequency $f_c$ among the light; j represents the imaginary unit; and t represents time.

A component $P_{NL}$ representing the cubic non-linear optical effect among the polarization induced in the optical fiber is represented by Expression 7.

$$\begin{aligned} P_{NL} &= \varepsilon_0 \chi^{(3)} E^3 \\ &= \frac{\varepsilon_0 \chi^{(3)}}{8} \{ E_a e^{-2\pi j f_a t} + E_b e^{-2\pi j f_b t} + \\ &\quad E_c e^{-2\pi j f_c t} + E_a^* e^{2\pi j f_a t} + E_b^* e^{2\pi j f_b t} + \\ &\quad E_c^* e^{2\pi j f_c t} \}^3 \end{aligned} \qquad \text{[Expression 7]}$$

where, $\varepsilon_0$ represents an electric permittivity of vacuum; $\chi^{(3)}$ represents an electric susceptibility of a cubic non-linear optical effect; and A* represents a complex conjugate of a complex A.

Accordingly, the component $P_{NL}$ representing the cubic non-linear optical effect among the polarization induced in the optical fiber has a frequency $f_{PNL}$ represented by Expression 8. The frequency $f_{PNL}$ of the component $P_{NL}$ representing the cubic non-linear optical effect among the polarization induced in the optical fiber may be referred to as a polarization frequency.

$$f_{PNL} = \pm f_a \pm f_b \pm f_c \qquad \text{[Expression 8]}$$

As described above, the pilot signal of this embodiment contains a component having the first frequency $f_1$ and a component having the second frequency $f_2$ higher by value $\Delta f$ than the first frequency $f_1$. Accordingly, the polarization frequency $f_{PLN}$ takes, for example, values represented by Expressions 9-16.

$$f_{PNL} = f_1 + f_1 - f_1 = f_1 \qquad \text{[Expression 9]}$$

$$f_{PNL} = f_1 + f_2 - f_2 = f_1 \qquad \text{[Expression 10]}$$

$$f_{PNL} = f_2 + f_2 - f_2 = f_2 \qquad \text{[Expression 11]}$$

$$f_{PNL}=f_2+f_1-f_1=f_2 \quad \text{[Expression 12]}$$

$$f_{PNL}=f_1+f_1+f_1=3f_1 \quad \text{[Expression 13]}$$

$$f_{PNL}=f_2+f_2+f_2=3f_2 \quad \text{[Expression 14]}$$

$$f_{PNL}=f_1-f_2+f_1=f_1-\Delta f \quad \text{[Expression 15]}$$

$$f_{PNL}=f_2+f_2-f_1=f_2+\Delta f \quad \text{[Expression 16]}$$

The polarization frequencies $f_{PNL}$ represented by Expressions 9 and 10 are equal to the first frequency $f_1$; the polarization frequencies $f_{PNL}$ represented by Expressions 11 and 12 are equal to the second frequency $f_2$. The power of each component included in a fraction transmitted during the pilot period among the received light and having a frequency the same as that of the pilot signal contains the power $P_{SPM}$ of the component being derived from self phase modulation and being contained in the noise component of the received light.

Accordingly, a signal having undergone the removal of components having frequencies the same as those of the pilot signal from the fraction transmitted during the pilot period among the received light has a power sufficiently close to the third parameter $P_A$. In other words, the power detected by the power detector 163 takes a value sufficiently close to the sum of the power being derived from the cross phase modulation and being contained in the noise component of the received light and the power of being derived from the spontaneously emitted light and being contained in the noise component of the received light. This means that the receiver 10 can precisely detect the third parameter $P_A$.

The second detector 15 and the third detector 16 may share the common function with the second detector 15 and the third detector 16. For example, the second detector 15 and the third detector 16 may share the function for detecting the pilot period.

Optical-to-electrical conversion sometimes standardizes the power of a signal. In this case, the power based on a light signal is different from the power based on an electric signal. Accordingly, in cases where one of the second and the third parameters is detected on the basis of an electric signal and the other is detected on the basis of a light signal, a fourth parameter that is to be detailed below is not precisely estimated unless either one of the second or the third parameters is corrected.

In contrast, both the second and the third parameters of this embodiment are detected on the basis of electric signals. For the above, this embodiment can precisely estimate the fourth parameter without correcting the second nor the third parameters.

The first detector 14, the second detector 15, and the third detector 16 collectively function as an example of a detector that detects the first to the third parameters.

On the basis of the detected first to third parameters, the nonlinear noise monitor 17 estimates the fourth parameter representing the ratio of the power of the signal component in the received light to the power of a component being derived from the self phase modulation and being contained in the noise component of the received light. As denoted in the left side of Expression 17, the fourth parameter of this example takes a value obtained by dividing the power $P_s$ of the signal component in the received light by the power $P_{SPM}$ being derived from the self phase modulation and being contained in the noise component of the received light. The symbol $\alpha$ in Expression 17 is represented by Expression 18.

$$\frac{P_S}{P_{SPM}} = \frac{(\alpha+1)R_{OSNR}}{\alpha - R_{OSNR}} \quad \text{[Expression 17]}$$

$$\alpha = \frac{P_t - P_A}{P_A} \quad \text{[Expression 18]}$$

In the first embodiment, the nonlinear noise monitor 17 calculates the fourth parameter using Expressions 17 and 18. The calculation of the fourth parameter is an example of estimation of the fourth parameter.

Here, description will now be made in relation to conductivity of Expression 17.

As denoted in Expression 19, the power $P_n$ of the noise component in the received light is the sum of the power $P_{ASE}$ of a component derived from the spontaneously emitted light in the noise component, the power $P_{XPM}$ of a component derived from the cross phase modulation in the noise component, and the power $P_{SPM}$ of a component derived from the self phase modulation in the noise component.

$$P_n = P_{ASE} + P_{XPM} + P_{SPM} \quad \text{[Expression 19]}$$

Expression 18 is deformed into Expression 20 on the basis of Expressions 4, 5, and 19.

$$\alpha = \frac{P_S + P_{SPM}}{P_{ASE} + P_{XPM}} \quad \text{[Expression 20]}$$

Furthermore, Expression 1 is deformed into Expression 21 on the basis of Expression 19.

$$R_{OSNR} = \frac{P_S}{P_{ASE} + P_{XPM} + P_{SPM}} \quad \text{[Expression 21]}$$

Expression 21 is deformed into Expression 22 by assigning Expression 20 to the right side of Expression 21 in order to cancel the power $P_{ASE}$ of a component derived from the spontaneously emitted light in the noise component and the power $P_{XPM}$ of a component derived from the cross phase modulation in the noise component.

$$R_{OSNR} = \frac{P_S}{\frac{P_S + P_{SPM}}{\alpha} + P_{SPM}} = \frac{\alpha P_S}{P_S + P_{SPM} + \alpha P_{SPM}} \quad \text{[Expression 22]}$$

Being simplified for the power $P_{SPM}$ of a component derived from the self phase modulation in the noise component and the signal component $P_s$, Expression 22 is deformed into Expression 23. Expression 23 is deformed into Expression 17 by dividing each side of Expression 23 by $(\alpha-R_{OSNR})P_{SPM}$. Expression 17 is conducted in the above manner.

$$(\alpha+1)R_{OSNR}P_{SPM}=(\alpha-R_{OSNR})P_s \quad \text{[Expression 23]}$$

The nonlinear noise monitor 17 is an example of an estimator that estimates the fourth parameter.

(Operation)

Here, description will now be made in relation to an example of the operation of the optical communication system 1.

The transmitter 20 transmits a third signal having a third frequency $f_{CF}$ as a carrier wave frequency at a third power and transmits a fourth signal having a fourth frequency $f_{OF}$ as a carrier wave frequency at a fourth power different from the third power.

Consequently, the receiver 10 receives light containing the third and the fourth signals transmitted from the transmitter 20 as signal components through the optical path 30.

The first detector 14 detects the power of a component having passed through the first OBPF among the received light to be the first power $P_{CF}$ and detects the power of a component having passed through a second OBPF among the received light to be the second power $P_{OF}$. Then the first detector 14 calculates a first parameter $R_{OSNR}$ on the basis of the detected first power $P_{CF}$ and second power $P_{OF}$ using Expressions 2 and 3.

Besides, the transmitter 20 transmits a pilot signal during the pilot period, and transmits a data signal during the data period different from the pilot period.

Consequently, the receiver 10 receives light containing the pilot signal and the data signal transmitted from the transmitter 20 as signal components through the optical path 30.

The second detector 15 detects the pilot period on the basis of a signal having undergone the compensation by the CDC 131 and the retained pilot signal, and also detects a period different from the detected pilot period to be the data period. The second detector 15 extracts a signal within the detected data period from the signal having undergone the compensation of the CDC 131. The second detector 15 detects the power of the extracted signal as the second parameter $P_t$.

Furthermore, the third detector 16 detects the pilot period on the basis of a signal having undergone the compensation by the CDC 131 and the retained pilot signal, and also extracts a signal within the detected pilot period from the signal having undergone the compensation of the CDC 131. The third detector 16 removes one or more components (in this embodiment, components having the first frequency $f_1$ and the second frequency $f_2$) having a frequency the same as that of the pilot signal from the extracted signal. The third detector 16 detects the power of a signal remaining after the removal as the third parameter $P_A$.

The nonlinear noise monitor 17 estimates the fourth parameter $P_s/P_{SPM}$ on the basis of the detected first to third parameters using Expressions 17 and 18.

As described above, the receiver 10 of the first embodiment detects a first parameter representing a ratio of the power of the signal component of the received light to the power of the noise component of the received light, and further detects a second parameter representing the sum of the power of the signal component of the received light and the power of the noise component of the received light.

In addition, the receiver 10 detects a third parameter representing the sum of the power of a component being derived from cross phase modulation and being contained in the noise component of the received light and the power of a component being derived from spontaneously emitted light and being contained in the noise component of the received light. Furthermore, the receiver 10 estimates a fourth parameter representing a ratio of the power of the signal component of the received light to the power of a component being derived from the self phase modulation and being contained in the noise component of the received light on the basis of the detected first to third parameters.

This can estimate a ratio of the power of the signal component of the received light to the power of a component being derived from the self phase modulation and being contained in the noise component of the received light without changing the power of a signal to be transmitted. Consequently, it is possible to highly precisely estimate the above ratio of a signal to be transmitted while the optical communication system 1 is working.

The transmitter 20 of the first embodiment transmits the third signal having the third frequency at the third power and transmits the fourth signal having the fourth frequency at the fourth power. In addition, the receiver 10 detects the first parameter on the basis of powers of components each having one of the third and fourth frequencies of the received light.

The powers of the components each having one of the third and fourth frequencies of the received light are highly correlated with the ratio of the power of the signal component of the received light to the power of the noise component of the received light. Accordingly, the receiver 10 can highly precisely detect the first parameter.

Furthermore, the receiver 10 detects the second parameter on the basis of the power of a fraction transmitted during the data period among the received light.

The power of the fraction transmitted during the data period among the received light takes a value sufficiently close to the sum of the power of the signal component of the received light and the power of the noise component of the received light. Accordingly, the receiver 10 can highly precisely detect the second parameter.

Furthermore, the receiver 10 of the first embodiment detects the third parameter on the basis of the power of a component being contained in the fraction transmitted during the pilot period among the received light and having a frequency different from that of the pilot signal.

The power of a component being contained in the fraction transmitted during the pilot period among the received light and having a frequency different from that of the pilot signal takes a value sufficiently close to the sum of the power of a component being derived from cross phase modulation and being contained in the noise component of the received light and the power of a component being derived from spontaneously emitted light and being contained in the noise component of the received light. Accordingly, the receiver 10 can highly precisely detect the third parameter.

Second Embodiment

Next, description will now be made in relation to an optical communication system according to a second embodiment. The optical communication system of the second embodiment is different from the optical communication system of the first embodiment in the point that the second and third parameters are detected on the basis of a light signal. The following description will focus on the difference. Like reference numbers between the first and second embodiments designate the same or the substantially same parts and elements.

Figure 7:
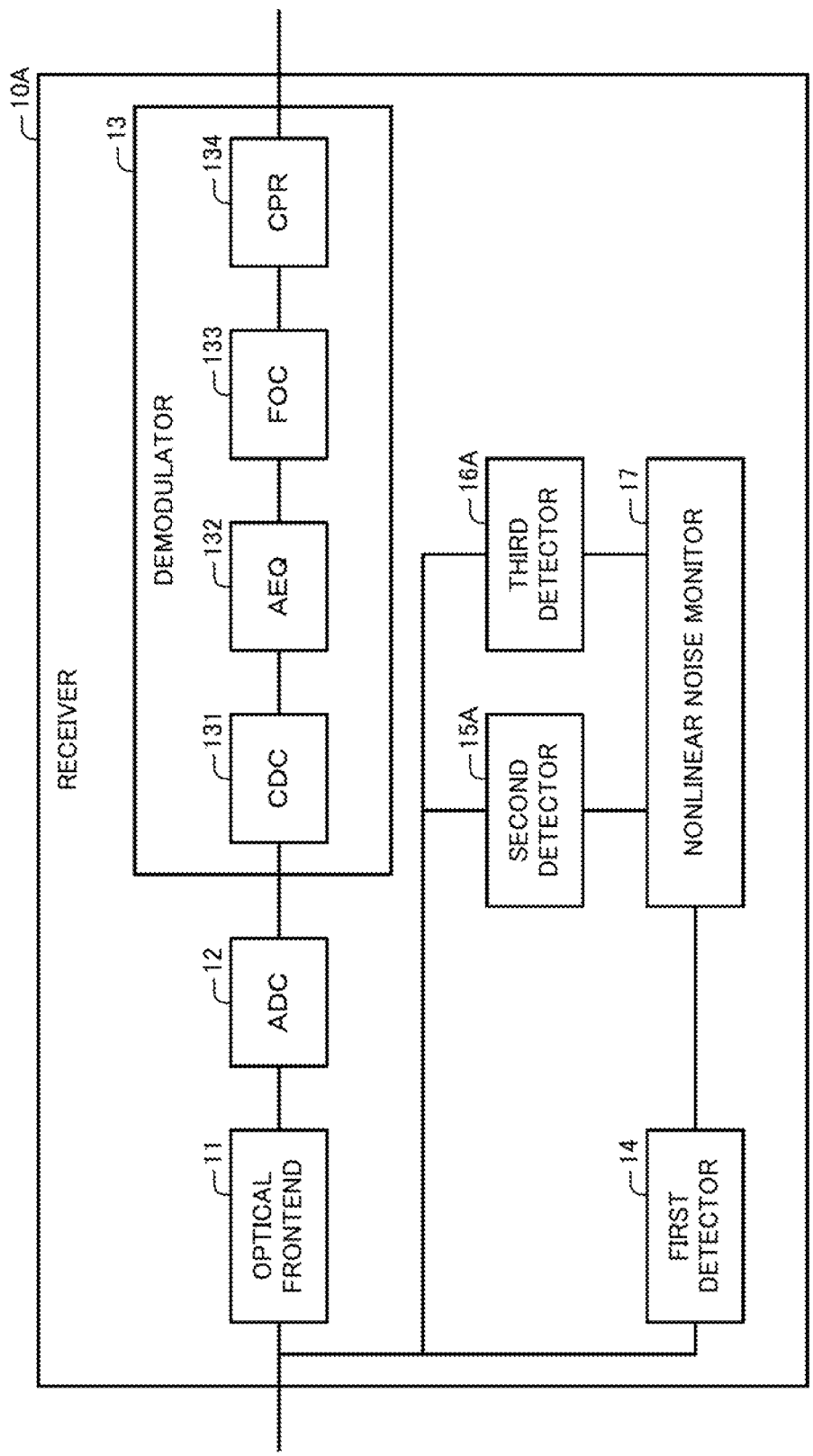
FIG. 7 is a block diagram schematically illustrating an example of the configuration of a receiver according to a second embodiment.

As illustrated in FIG. 7, the receiver 10A of the second embodiment includes a second detector 15A and a third detector 16A in place of the second detector 15 and the third detector 16 of FIG. 2, respectively.

The second detector 15A includes a light spectrum analyzer that detects a light spectrum of the received light. The second detector 15A detects the second parameter $P_t$ on the basis of the light spectrum detected by the light spectrum analyzer.

Figure 8:
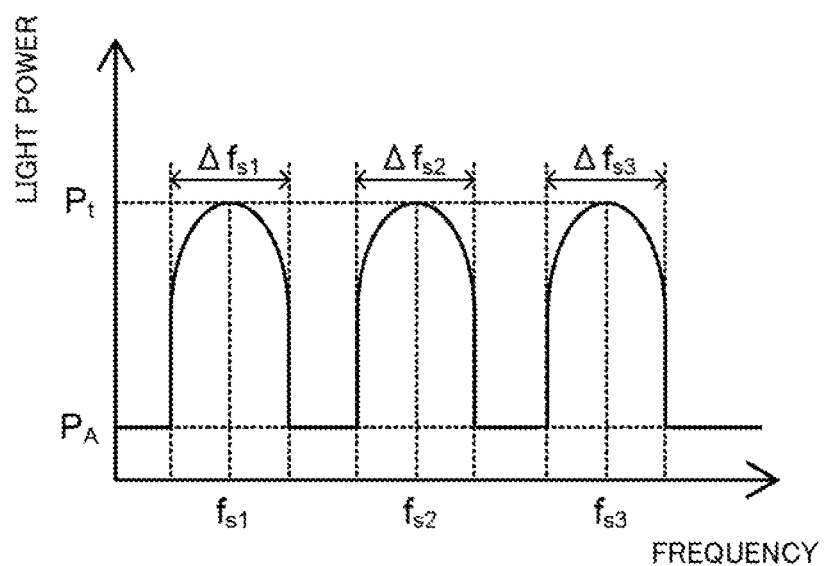
FIG. 8 is a graph depicting an example of a signal spectrum of the received light.

FIG. 8 depicts an example of the light spectrum of the received light. In the light spectrum of the received light, the light power of each frequency (in this embodiment, each of frequencies $f_{s1}$, $f_{s2}$, and $f_{s3}$) that the signal transmitted by the transmitter 20 has is the same as the sum $P_t$ of the power $P_s$ of the signal component of received light and the power $P_n$ of the noise component of the received light.

Accordingly, the second detector 15A detects the light powers of the frequencies, that the signal transmitted by the transmitter 20 has, in the detected light spectrum to be the second parameter $P_r$.

The third detector 16A includes a light spectrum analyzer that detects a light spectrum of the received light. The third detector 16A detects the third parameter $P_A$ on the basis of the light spectrum detected by the light spectrum analyzer.

In the light spectrum of the received light, the light power of a frequency outside the signal bandwidth is the sum $P_A$ of the power $P_{XPM}$ of a component being derived from cross phase modulation and being contained in the noise component of the received light and the power $P_{ASE}$ of a component being derived from spontaneously emitted light and being contained in the noise component of the received light. For example, the signal bandwidth is a bandwidth near to the frequency that the signal transmitted from the transmitter 20 has. The signal bandwidth of this embodiment has one or more predetermined bandwidths (in this embodiment, bandwidths $\Delta f_{s1}$, $\Delta f_{s2}$, and $\Delta f_{s3}$), the center of each of which is located at the frequency (in this embodiment, each of frequencies $f_{s1}$, $f_{s2}$, and $f_{s3}$) that the signal transmitted by the transmitter 20 has.

Accordingly, the third detector 16A detects the light power of a frequency outside of the signal bandwidth in the detected light spectrum to be the third parameter $P_A$.

The second detector 15A and the third detector 16A may share the common function with the second detector 15A and the third detector 16A. For example, the second detector 15 and the third detector 16A may share a single light spectrum analyzer.

Optical-to-electrical conversion sometimes standardizes the power of a signal. In this case, the power based on a light signal is different from the power based on an electric signal. Accordingly, in cases where one of the second and the third parameters is detected on the basis of an electric signal and the other is detected on the basis of a light signal, a fourth parameter is not precisely estimated unless either of the second and the third parameters is corrected.

In contrast, both the second and the third parameters of the present example are detected on the basis of light signals. For the above, this embodiment can precisely estimate the fourth parameter without correcting the second or the third parameters.

The receiver 10A of the second embodiment provides the same effects and advantages as the receiver 10 of the first embodiment.

Furthermore, the receiver 10A of the second embodiment detects the second parameter on the basis of the power of a component having a frequency the same as that of the signal among the received light.

The power of a component having a frequency the same as that of the signal among the received light takes a value sufficiently close to the sum of the power of the signal component of the received light and the power of the noise component of the received light. Accordingly, the receiver 10A can highly precisely detect the second parameter.

Furthermore, the receiver 10A of the second embodiment detects the third parameter on the basis of the power of a component having a frequency different from that of the signal among the received light.

The power of a component having a frequency different from that of the signal among the received light takes a value sufficiently close to the sum of the power of a component being derived from the cross phase modulation and being contained in the noise component of the received light and the power of a component being derived from spontaneously emitted light and being contained in the noise component of the received light. Accordingly, the receiver 10A can highly precisely detect the third parameter.

Third Embodiment

Next, description will now be made in relation to an optical communication system according to a third embodiment. The optical communication system of the third embodiment is different from the optical communication system of the first embodiment in the point that the first parameter is detected on the basis of an electric signal. The following description will focus on the difference. Like reference numbers between the first and third embodiments designate the same or the substantially same parts and elements.

Figure 9:
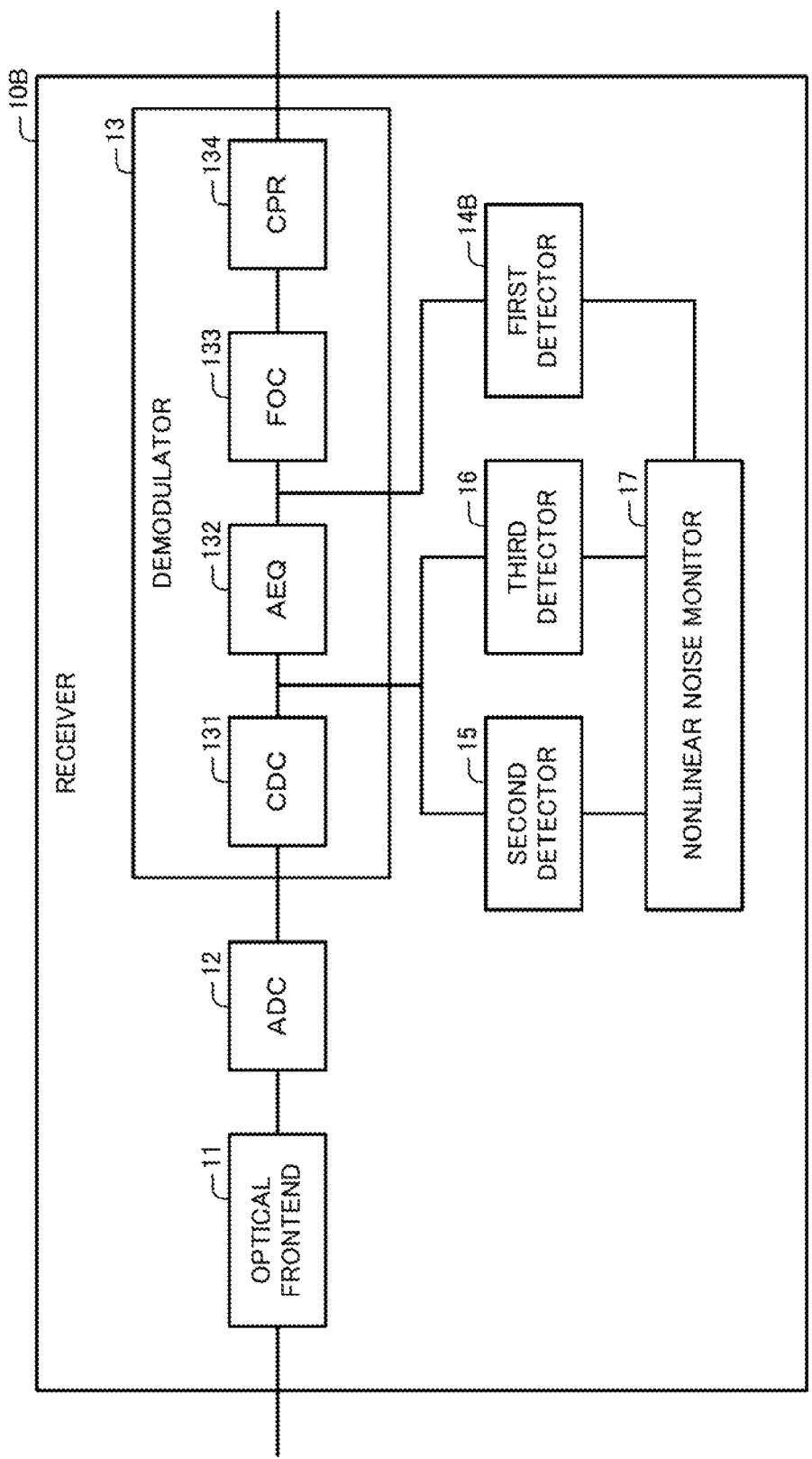
FIG. 9 is a block diagram schematically illustrating an example of the configuration of a receiver according to a third embodiment.

As illustrated in FIG. 9, the receiver 10B of the third embodiment includes a first detector 14B in place of the first detector 14 of FIG. 2.

In this embodiment, the first detector 14B detects the first parameter $R_{OSNR}$ on the basis of the moment of a signal having undergone the compensation by the AEQ 132. The signal having undergone the compensation by the AEQ 132 may also be referred to as a signal having undergone adaptive equalization.

The n-th symbol $y_n$ of the signal having undergone the adaptive equalization is represented by Expression 24.

$$y_n = \sqrt{C} a_n e^{j\theta_n} + \sqrt{N} w_n \qquad \text{[Expression 24]}$$

where, n represents an integer; $a_n$ represents the amplitude of the n-th symbol; $w_n$ represents an amplitude of the noise on the n-th symbol; C represent the magnification of the power of at the signal; N represents the magnification of the power of the noise; and $\theta_n$ represents the noise on the phase of the n-th symbol.

Under a state where Expression 25 is satisfied, the second moment $\mu_2$ of the n-th symbol of the signal having undergone the adaptive equalization is represented by Expression 26.

$$v = E\{|a_n|^2\} = E\{|w_n|^2\} \qquad \text{[Expression 25]}$$

where, $E\{X\}$ is an expected value of a variable X.

$$\mu_2 = E\{y_n y^*_n\} = v(C+N) \qquad \text{[Expression 26]}$$

The fourth moment $\mu_4$ of the n-th symbol of the signal having undergone the adaptive equalization is represented by Expression 27.

$$\mu_4 = E\{(y_n y^*_n)^2\} = k_a v^2 C^2 + 4v^2 CN + k_w v^2 N^2 \qquad \text{[Expression 27]}$$

where, $k_a$ is represented by Expression 28.

$$k_a = \frac{E\{|a_n|^4\}}{E\{|a_n|^2\}^2} \qquad \text{[Expression 28]}$$

where, $k_w$ is represented by Expression 29.

$$k_w = \frac{E\{|w_n|^4\}}{E\{|w_n|^2\}^2} \qquad \text{[Expression 29]}$$

A Carrier to Noise Ratio $R_{CNR}$ calculated by dividing the magnification C of the power of a signal by the magnification N of the power of a noise on the basis of Expressions 26 and 27 is represented by Expression 30.

$$R_{CNR} = \frac{C}{N} = \frac{\sqrt{2\mu_2^2 - \mu_4}}{\mu_2\sqrt{2-k_a} - \sqrt{2\mu_2^2 - \mu_4}} \quad \text{[Expression 30]}$$

The relationship between the first parameter $R_{OSNR}$ and the Carrier to Noise Ratio $R_{CNR}$ is represented by Expression 31.

$$R_{OSNR} = 10\,\log_{10}(R_{CNR}) + 10\,\log_{10}\left(\frac{R_s}{B_r}\right) \quad \text{[Expression 31]}$$

where, $R_s$ represents the symbol rate; $B_r$ represents the reference value of the bandwidth.

An example of the reference value $B_r$ of the bandwidth is 12.5 GHz. In Expression 31, the first parameter $R_{OSNR}$ is expressed in the unit of dB.

In this embodiment, the first detector 14B detects the first parameter $R_{OSNR}$ using Expressions 30 and 31. The value $k_a$ is determined depending on the modulation scheme. For example, if the Quadriphase Phase-Shift Keying (QPSK) is applied to the modulation scheme, the value $k_a$ is 1; and if 16 Quadrature Amplitude Modulation (16QAM) is applied, the value $k_a$ is 1.32.

In the third embodiment, the first detector 14B calculates the second moment $\mu_2$ and the fourth moment $\mu_4$ using Expressions 32 and 33. L represents an integer of two or more.

$$\mu_2 \approx \frac{1}{L}\sum_{n=0}^{L-1} |y_n|^2 \quad \text{[Expression 32]}$$

$$\mu_4 \approx \frac{1}{L}\sum_{n=0}^{L-1} |y_n|^4 \quad \text{[Expression 33]}$$

The receiver 10B of the third embodiment provides the same effects and advantages as the receiver 10 of the first embodiment.

The receiver 10B of the third embodiment detects the first parameter on the basis of the moment of the signal having undergone the adaptive equalization.

The moment of the signal having undergone the adaptive equalization is highly correlated with the ratio of the power of the signal component of the received light to the power of the noise component of the received light. Accordingly, the receiver 10B can highly precisely detect the first parameter.

Fourth Embodiment

Next, description will now be made in relation to an optical communication system according to a fourth embodiment. The optical communication system of the fourth embodiment is different from the optical communication system of the first embodiment in the point that the first parameter is detected on the basis of an electric signal. The following description will focus on the difference. Like reference numbers between the first and fourth embodiments designate the same or the substantially same parts and elements.

Figure 10:
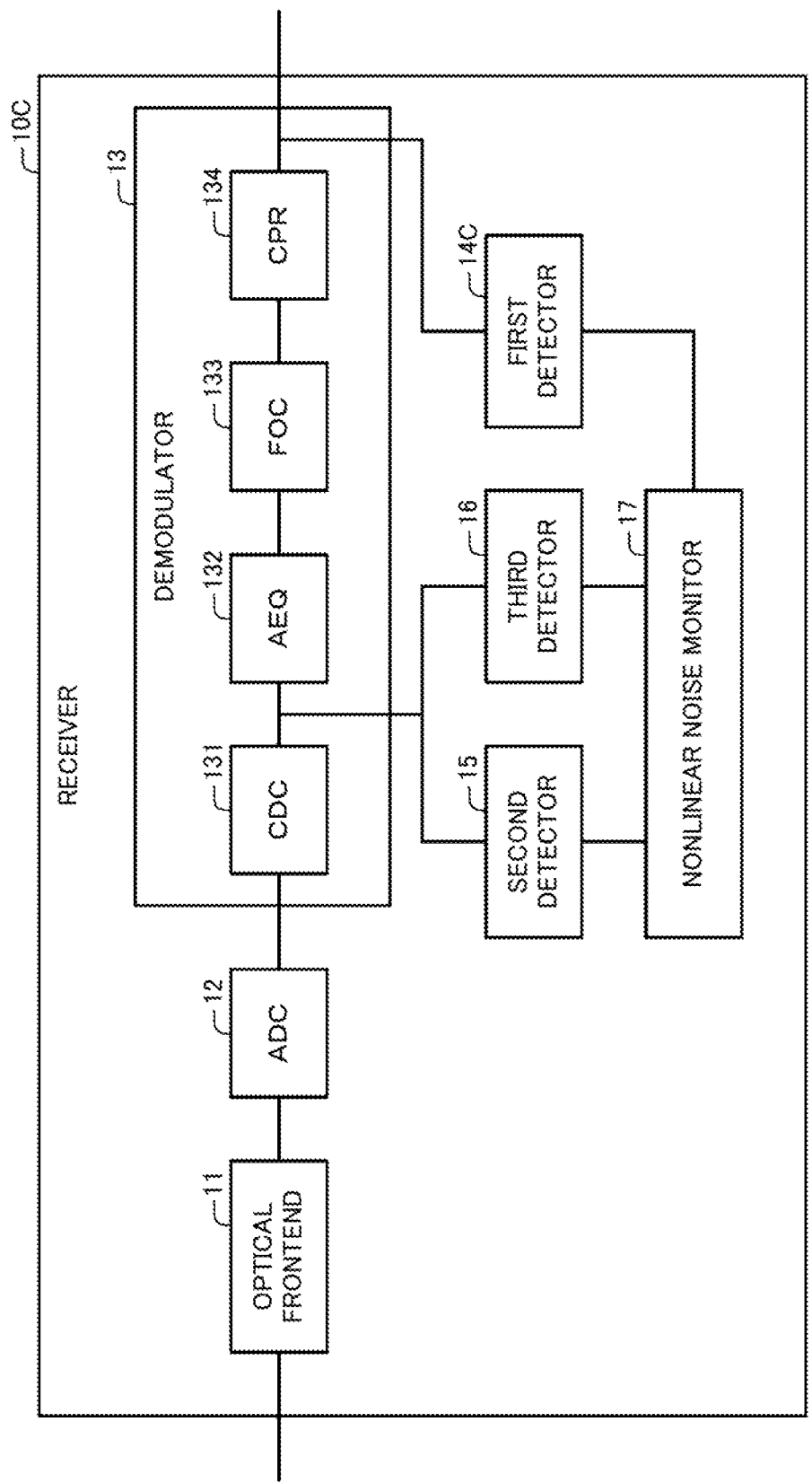
FIG. 10 is a block diagram schematically illustrating an example of the configuration of a receiver according to a fourth embodiment.

As illustrated in FIG. 10, the receiver 10C of the fourth embodiment includes a first detector 14C in place of the first detector 14 of FIG. 2.

In this embodiment, the first detector 14C detects the first parameter $R_{OSNR}$ on the basis of an error of the signal having undergone the compensation by the CPR 134. The signal having undergone the compensation by the CPR 134 may also be referred to as a signal having undergone the compensation for the phase deviation. In this embodiment, the error of a signal having undergone the compensation for the phase deviation is the magnitude of the difference between a vector representing a signal point of the transmitted signal and a vector representing a signal point of the received signal in the signal space diagram (namely, the constellation).

The relationship between the average $V_{avg}$ of the errors of the signal having undergone the compensation for the phase deviation and the first parameter $R_{OSNR}$ is represented by Expression 34.

$$V_{avg} = \left[\frac{1}{R_{OSNR}}\sqrt{\frac{96/\pi}{(M-1)R_{OSNR}}\sum_{i=1}^{\sqrt{M}-1}\gamma_i e^{-\alpha_i} + \sum_{i=1}^{\sqrt{M}-1}\gamma_i \beta_i \text{erfc}\left(\sqrt{\alpha_i}\right)}\right]^{1/2} \quad \text{[Expression 34]}$$

where, M represents the number of signal points in the signal space diagram; $\alpha_i$ is represented by Expression 35; $\beta_i$ is represented by Expression 36; and $\gamma_i$ is represented by Expression 37.

$$\alpha_i = \frac{3\beta_i^2 R_{OSNR}}{2(M-1)} \quad \text{[Expression 35]}$$

$$\beta_i = 2i - 1 \quad \text{[Expression 36]}$$

$$\gamma_i = 1 - \frac{i}{\sqrt{M}} \quad \text{[Expression 37]}$$

As denoted by Expression 38, the average $V_{avg}$ of the errors of the signal having undergone the compensation for the phase deviation is the product of a coefficient k and the maximum value $V_{max}$ of the errors of the signal having undergone the compensation for the phase deviation. The coefficient k is represented by Expression 39.

$$V_{avg} = kV_{max} \quad \text{[Expression 38]}$$

$$k = \frac{|E_{t,max}|}{\sqrt{\frac{1}{M}\sum_{i=1}^{M}|E_{ideal,i}|^2}} \quad \text{[Expression 39]}$$

where, $|E_{t,max}|$ represents the maximum value of the magnitude of the vector $E_{ideal,i}$ among M signal points; i represents an integer of from 1 to M; and $E_{ideal,i}$ represent a vector representing a signal point of the transmitted signal.

The maximum value $V_{max}$ of the errors of the signal having undergone the compensation for the phase deviation is represented by Expression 40.

$$V_{max} = \frac{\sigma_{err}}{|E_{t,max}|} \qquad \text{[Expression 40]}$$

where, $\sigma_{err}$ represents the root mean square value of the errors of the signal having undergone compensation for phase deviation for N symbols; N represents an integer.

The mean square value $\sigma_{err}^2$ of the errors of the signal having undergone compensation for the phase deviation for N symbols is represented by Expression 41.

$$\sigma_{err}^2 = \frac{1}{N}\sum_{n=1}^{N}|E_{r,n} - E_{t,n}|^2 \qquad \text{[Expression 41]}$$

where, n represents an integer of one from N; $E_{t,n}$ represents a vector representing a signal point of the transmitted signal; and $E_{r,n}$ represents a vector representing a signal point of the received signal.

In this embodiment, the first detector 14C detects the first parameter $R_{OSNR}$ using Expressions 34-41.

The receiver 10C of the fourth embodiment provides the same effects and advantages as the receiver 10 of the first embodiment.

Furthermore, the receiver 10C of the fourth embodiment detects the first parameter on the basis of the error of the signal having undergone the compensation for the phase deviation.

The error of the signal having undergone the compensation for the phase deviation is highly correlated with the ratio of the power of the signal component of the received light to the power of the noise component of the received light. Accordingly, the receiver 10C can highly precisely detect the first parameter.

Fifth Embodiment

Next, description will now be made in relation to an optical communication system according to a fifth embodiment. The optical communication system of the fifth embodiment is different from the optical communication system of the first embodiment in the point that the reception of a signal is controlled on the basis of the fourth parameter. The following description will focus on the difference. Like reference numbers between the first and fifth embodiments designate the same or the substantially same parts and elements.

Figure 11:
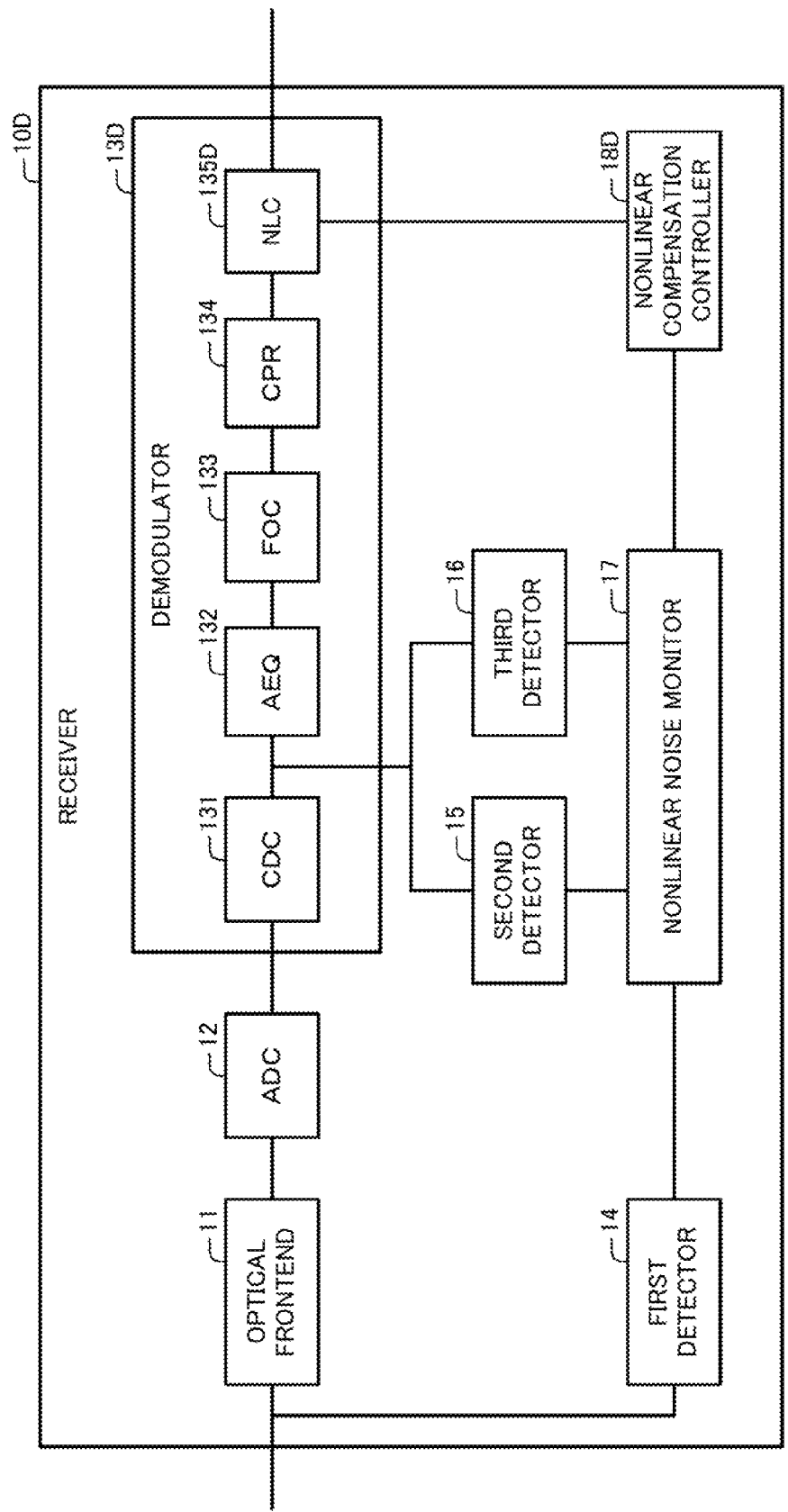
FIG. 11 is a block diagram schematically illustrating an example of the configuration of a receiver according to a fifth embodiment.

As illustrated in FIG. 11, the receiver 10D of the fifth embodiment includes a modulator 13D in place of the demodulator 13 of FIG. 2, and further includes a nonlinear compensation controller 18D.

Differently from the demodulator 13 of FIG. 2, the demodulator 13D includes a Nonlinear Compensator (NLC) 135D in addition to the demodulator 13. The NLC 135D compensates for distortion of the waveform of the received light, whose distortion is caused by the non-linear optical effect.

The nonlinear compensation controller 18D controls the compensation for the distortion by the NLC 135D on the basis of the fourth parameter estimated by the nonlinear noise monitor 17.

For example, when an amount of fluctuation of the fourth parameter estimated by the nonlinear noise monitor 17 is larger than a predetermined threshold, the nonlinear compensation controller 18D may control the NLC 135D such that the amount of compensating for the distortion increases. In contrast, when an amount of fluctuation of the fourth parameter estimated by the nonlinear noise monitor 17 is equal to or smaller than the predetermined threshold, the nonlinear compensation controller 18D may control the NLC 135D such that the amount of compensation for the distortion is maintained.

The receiver 10D of the fifth embodiment provides the same effects and advantages as the receiver 10 of the first embodiment.

Furthermore, the receiver 10D of the fifth embodiment controls the receiving of a signal on the basis of the estimated fourth parameter.

This can appropriately control a component derived from self phase modulation among the noise component.

The NLC 135D is arranged downstream of the CPR 134 and compensates for the distortion that the signal having undergone the compensation by the CPR 134 has. Alternatively, the NLC 135D may be arranged between the CDC 131 and the AEQ 132 and may compensate for the distortion of the signal having undergone the compensation by the CDC 131.

Further alternatively, the demodulator 13D may include multiple CDCs arranged upstream of the AEQ 132. With this arrangement, the NLC 135D may be arranged between adjacent two of the CDCs or may also be arranged between the CDC at the last stage and the AEQ 132.

Alternatively, the transmitter 20 may include a non-linear pre-equalization circuit that compensates for distortion of the waveform, whose distortion would be caused from the non-linear optical effect in advance. In this alternative, the receiver 10D may transmit the estimated fourth parameter to the transmitter 20, and the transmitter 20 may control the compensation for the distortion by the non-linear pre-equalization circuit on the basis of the received fourth parameter.

The optical communication system 1 may control the modulation scheme on the basis of the estimated fourth parameter. Besides, the optical communication system 1 may control the gain of a light amplifier disposed on the optical path 30 on the basis of the estimated fourth parameter. The optical communication system 1 may control a parameter to control digital signal processing at least one of the receiver 10D and the transmitter 20 on the basis of the estimated fourth parameter.

The above first to fifth embodiments may be combined appropriately.

A ratio of the power of the signal component of the received light to a power of a component being derived from self phase modulation and being contained in the noise component of the received light can be precisely estimated.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An estimating device comprising:
a detector that detects a first parameter representing a ratio of a power of a signal component in received light to a power of a noise component in the received signal, a second parameter representing a sum of the power of the signal component and the power of the noise component, and a third parameter representing a sum of a power of a component being derived from cross phase modulation and being contained in the noise component and a power of a component being derived from spontaneously emitted light and being contained in the noise component; and an estimator that estimates, based on the first through the third parameters, a fourth parameter representing a ratio of the power of the signal component to a power of a component being derived from self phase modulation and being contained in the noise component.

2. The estimating device according to claim 1, wherein the estimator estimates the fourth parameter using Expression 42, $$\frac{P_s}{P_{SPM}} = \frac{(\alpha + 1)R_{OSNR}}{\alpha - R_{OSNR}} \qquad \text{[Expression 42]}$$

where, $P_s/P_{SPM}$ represents the fourth parameter, $P_s$ represents the power of the signal component, $P_{SPM}$ represents the power of the component being derived from the self phase modulation and being contained in the noise component, $R_{OSNR}$ is represented by Expression 43 and represents the first parameter, $$R_{OSNR} = \frac{P_s}{P_n} \qquad \text{[Expression 43]}$$

where, $P_n$ is represented by Expression 44 and represents the power of the noise component, $$P_n = P_{ASE} + P_{SPM} + P_{XPM} \qquad \text{[Expression 44]}$$

where, $P_{XPM}$ represents the power of the component being derived from the cross phase modulation and being contained in the noise component, $P_{ASE}$ represents the power of the component being derived from the spontaneously emitted light and being contained in the noise component, and $\alpha$ is represented by Expression 45, $$\alpha = \frac{P_t - P_A}{P_A} \qquad \text{[Expression 45]}$$

where, $P_t$ is represented by Expression 46 and represents the second parameter, $$P_t = P_s + P_n \qquad \text{[Expression 46]}$$

where, $P_A$ is represented by Expression 47 and represents the third parameter, $$P_A = P_{ASE} + P_{XPM} \qquad \text{[Expression 47]}.$$

3. The estimating device according to claim 1, wherein:
a first signal is transmitted during a first period;
a second signal is transmitted during a second period; and
the detector detects, based on a power of a component being contained in a fraction transmitted during the first period among the received light and having a frequency different from a frequency of the first signal, the third parameter.

4. The estimating device according to claim 3, wherein the detector detects, based on a power of a fraction transmitted during the second period among the received light, the second parameter.

5. The estimating device according to claim 1, wherein the detector detects, based on a power of a component being contained in the received light and having a frequency different from a frequency of a signal, the third parameter.

6. The estimating device according to claim 5, wherein the detector detects, based on a power of a component being contained in the received light and having a frequency the same as the frequency of the signal, the second parameter.

7. The estimating device according to claim 1, wherein:
a third signal having a third frequency is transmitted at a third power;
a fourth signal having a fourth frequency is transmitted at a fourth power; and
the detector detects, based on a power of a component having the third frequency and being contained in the received light and a power of a component having the fourth frequency and being contained in the received light, the first parameter.

8. The estimating device according to claim 1, wherein the detector detects, based on a moment of a signal having undergone adaptive equalization, the first parameter.

9. The estimating device according to claim 1, wherein the detector detects, based on an error of a signal having undergone compensation for phase deviation, the first parameter.

10. The estimating device according to claim 1, further comprising a controller that controls, based on the estimated fourth parameter, at least one of transmitting and receiving of a signal.

11. A method for estimating comprising:
detecting a first parameter representing a ratio of a power of a signal component in received light to a power of a noise component in the received signal, a second parameter representing a sum of the power of the signal component and the power of the noise component, and a third parameter representing a sum of a power of a component being derived from cross phase modulation and being contained in the noise component and the power of a component being derived from spontaneously emitted light and being contained in the noise component; and estimating, based on the first through the third parameters, a fourth parameter representing a ratio of the power of the signal component to a power of a component being derived from self phase modulation and being contained in the noise component.

12. The method according to claim 11, wherein the estimating includes estimating the fourth parameter using Expression 48, $$\frac{P_s}{P_{SPM}} = \frac{(\alpha + 1)R_{OSNR}}{\alpha - R_{OSNR}} \qquad \text{[Expression 48]}$$

where, $P_s/P_{SPM}$ represents the fourth parameter, $P_s$ represents the power of the signal component, $P_{SPM}$ represents the power of the component being derived from the self phase modulation and being contained in the noise component, $R_{OSNR}$ is represented by Expression 49 and represents the first parameter, $$R_{OSNR} = \frac{P_s}{P_n} \quad \text{[Expression 49]}$$

where, $P_n$ is represented by Expression 50 and represents the power of the noise component, $$P_n = P_{ASE} + P_{SPM} + P_{XPM} \quad \text{[Expression 50]}$$

where, $P_{XPM}$ represents the power of the component being derived from the cross phase modulation and being contained in the noise component, $P_{ASE}$ represents the power of the component being derived from the spontaneously emitted light and being contained in the noise component, and α is represented by Expression 51, $$\alpha = \frac{P_t - P_A}{P_A} \quad \text{[Expression 51]}$$

where, $P_t$ is represented by Expression 52 and represents the second parameter, $$P_t = P_s + P_n \quad \text{[Expression 52]}$$

where, $P_A$ is represented by Expression 53 and represents the third parameter, $$P_A = P_{ASE} + P_{XPM} \quad \text{[Expression 53]}.$$

13. The method according to claim 11, wherein:
a first signal is transmitted during a first period;
a second signal is transmitted during a second period; and
the detecting includes detecting, based on a power of a component being contained in a fraction transmitted during the first period among the received light and having a frequency different from a frequency of the first signal, the third parameter.

14. The method according to claim 13, wherein the detecting includes detecting, based on a power of a fraction transmitted during the second period among the received light, the second parameter.

15. The method according to claim 11, wherein the detecting includes detecting, based on a power of a component being contained in the received light and having a frequency different from a frequency of a signal, the third parameter.

16. The method according to claim 15, wherein the detecting includes detecting, based on a power of a component being contained in the received light and having a frequency the same as the frequency of the signal, the second parameter.

17. The method according to claim 11, wherein:
a third signal having a third frequency is transmitted at a third power;
a fourth signal having a fourth frequency is transmitted at a fourth power; and
the detecting includes detecting, based on a power of a component having the third frequency and being contained in the received light and a power of a component having the fourth frequency and being contained in the received light, the first parameter.

18. The method according to claim 11, wherein the detecting includes detecting, based on a moment of a signal having undergone adaptive equalization, the first parameter.

19. The method according to claim 11, wherein the detecting includes detecting, based on an error of a signal having undergone compensation for phase deviation, the first parameter.

20. The method according to claim 11, further comprising controlling, based on the estimated fourth parameter, at least one of transmitting and receiving of a signal.

* * * * *